(12) United States Patent
Nauen

(10) Patent No.: US 11,567,174 B2
(45) Date of Patent: Jan. 31, 2023

(54) STOCHASTICALLY CLOCKED IMAGE GENERATION OF A LIDAR SYSTEM

(71) Applicant: OSRAM Beteiligungsverwaltung GmbH, Gruenwald (DE)

(72) Inventor: Andre Nauen, Regensburg (DE)

(73) Assignee: OSRAM BETEILIGUNGSVERWALTUNG GMBH, Gruenwald (DE)

( * ) Notice: Subject to any disclaimer, the term of this patent is extended or adjusted under 35 U.S.C. 154(b) by 379 days.

(21) Appl. No.: 16/644,534

(22) PCT Filed: Aug. 8, 2018

(86) PCT No.: PCT/EP2018/071497
§ 371 (c)(1),
(2) Date: Mar. 5, 2020

(87) PCT Pub. No.: WO2019/048168
PCT Pub. Date: Mar. 14, 2019

(65) Prior Publication Data
US 2020/0191968 A1    Jun. 18, 2020

(30) Foreign Application Priority Data
Sep. 5, 2017   (DE) ............... 10 2017 215 614.7

(51) Int. Cl.
*G01S 17/89*       (2020.01)
*G01S 7/481*       (2006.01)
(Continued)

(52) U.S. Cl.
CPC ............ *G01S 7/4814* (2013.01); *G01S 7/484* (2013.01); *G01S 7/4817* (2013.01); *G01S 17/10* (2013.01); *G01S 17/89* (2013.01); *G01S 17/32* (2013.01)

(58) Field of Classification Search
CPC ...... G01S 7/4814; G01S 7/4817; G01S 7/484; G01S 17/10; G01S 17/89; G01S 17/32; G01S 7/003
See application file for complete search history.

(56) References Cited

U.S. PATENT DOCUMENTS

| 6,839,127 B1 | 1/2005 | Anderson |
| 2013/0088726 A1 | 4/2013 | Goyal et al. |

(Continued)

FOREIGN PATENT DOCUMENTS

| DE | 10323317 A1 | 12/2004 |
| DE | 102015002282 A1 | 11/2015 |

(Continued)

OTHER PUBLICATIONS

German search report issued for the corresponding DE application No. 10 2017 215 614.7, dated Aug. 10, 2018, 14 pages (for informational purposes only).

(Continued)

*Primary Examiner* — Jonathan M Hansen
(74) *Attorney, Agent, or Firm* — Viering, Jentschura & Partner mbB

(57) ABSTRACT

A method for operating a sensor system may include predefining a spatial region to be detected in the surroundings of a light emission device, scanning the predefined spatial region by light beams emitted by the light emission device in different spatial directions, driving an emitter with a control unit based on a random component, emitting light beams from the emitter in the direction of a scanning unit at random points in time, and deflecting the light beams, using the scanning unit, in the different spatial directions along which the light beams leave the light emission device. The sensor system may include the control unit and the light (Continued)

emission device where the light emission device includes the emitter and the scanning unit.

17 Claims, 3 Drawing Sheets

(51) Int. Cl.
    *G01S 7/484*     (2006.01)
    *G01S 17/10*     (2020.01)
    *G01S 17/32*     (2020.01)

(56) References Cited

U.S. PATENT DOCUMENTS

| | | |
|---|---|---|
| 2014/0240721 A1 | 8/2014 | Herschbach |
| 2014/0257595 A1 | 9/2014 | Tillmann |
| 2016/0146941 A1 | 5/2016 | Hassenpflug et al. |
| 2017/0082735 A1* | 3/2017 | Slobodyanyuk ........ G01S 17/42 |
| 2017/0262732 A1 | 9/2017 | Deng et al. |
| 2018/0284277 A1* | 10/2018 | LaChapelle ............. G01S 17/89 |
| 2018/0299553 A1* | 10/2018 | Takemoto ............. G01S 7/4865 |
| 2019/0086541 A1* | 3/2019 | Kubota ................... G01S 7/484 |
| 2020/0150228 A1* | 5/2020 | Kapusta .................. G01S 17/10 |
| 2021/0271158 A1* | 9/2021 | Smits .................... H04N 9/3185 |

FOREIGN PATENT DOCUMENTS

| | | |
|---|---|---|
| DE | 102014223900 A1 | 5/2016 |
| EP | 3196863 A1 | 7/2017 |

OTHER PUBLICATIONS

International search report issued for the corressponding PCT application No. PCT/EP2018/071497, dated Nov. 22, 2018, 14 pages (for informational purposes only).

* cited by examiner

STOCHASTICALLY CLOCKED IMAGE GENERATION OF A LIDAR SYSTEM

CROSS-REFERENCE TO RELATED APPLICATIONS

The present application is a national stage entry according to 35 U.S.C. § 371 of PCT application No.: PCT/EP2018/071497 filed on Aug. 8, 2018; which claims priority to German application No.: 10 2017 215 614.7 filed on Sep. 5, 2017; both of which are incorporated herein by reference in their entirety and for all purposes.

TECHNICAL FIELD

A method for operating a sensor system may include a light emission device, which has an emitter and a scanning unit, and a control unit, wherein the light emission device is configured to scan its surroundings at least partly randomly.

BACKGROUND

In many cases, the light emission device is a laser scanner or a LIDAR system. The function of a LIDAR system is based on a time-of-flight measurement of emitted light signals. The term light here is intended to encompass the entire electromagnetic spectrum from the ultraviolet through the visible to the infrared. Electromagnetic beams in the wavelength range of approximately 850 to approximately 1600 nm (nanometers) are usually used for LIDAR systems. If said beams impinge on surfaces in the surroundings of the LIDAR system, then part of the emitted electromagnetic radiation or the emitted radiation power is reflected in the direction of the LIDAR system. Accordingly, the pulse echo, that is to say light beams reflected at an object, can be recorded by a suitable sensor. If the pulse is emitted at the point in time $z0$ and the echo signal is detected at a later point in time $z1$, then it is possible to calculate the distance d to the reflective surface with the time of flight $dta=z1-z0$ according to $d=dta*c/2$. In this case, c is the value of the speed of light. This method works expediently with light pulses which, using for example semiconductor laser diodes having a wavelength of, 905 nm, have an FWHM pulse width tp of $1\ ns<tp<100\ ns$ (FWHM=Full Width at Half Maximum).

Previously known LIDAR systems or LIDAR sensors scan surroundings of the LIDAR system according to a predefined pattern. Various disadvantages can arise here in unfavorable cases. As a result of a systematic scanning of the surrounding region, for example from left to right, an object situated at the end of the detection range of the LIDAR sensor could be recognized relatively late. Secondly, in a manner governed by the speed of a vehicle and the measurement frequency of the LIDAR sensor, so-called aliasing artefacts could occur, particularly if the sampling rate is less than twice the highest frequency occurring in the signal (Nyquist-Shannon sampling theorem). Beat or stroboscopic effects representing a distortion of reality could also arise with customary LIDAR systems.

The problem addressed is therefore that of providing a LIDAR system which affords a possibility for detecting a larger field of view more rapidly and thus also enabling more rapid object recognition. Moreover, so-called aliasing artefacts are intended to be reduced, which is additionally intended to enable more reliable recording of objects in the surroundings of a light emission device and thus improved downstream object recognition.

SUMMARY

A method for operating a sensor system may include a light emission device, which has an emitter and a scanning unit, and a control unit, wherein the light emission device is configured to scan its surroundings at least partly randomly. The terms "stochastically" or "stochastic process" or "random process" describe a sequence of temporally ordered, random processes. Said sequence can be generated by physical random number generators or pseudo-random number generators, for example.

In order to improve signal-to-noise ratios, in an expediently constructed LIDAR system a plurality of single-pulse measurements described above are computed with one another in order to improve the signal-to-noise ratio by averaging, for example. The signal-to-noise ratio is also known by the term raised margin. The signal-to-noise ratio is defined as the ratio of an average power of a useful signal to an average noise power of an interference signal. A customary LIDAR system furthermore uses differently configured transmitter and receiver concepts in order to be able to detect the distance information in different spatial directions. Thus, a two- or three-dimensional image of the surroundings is then generated, said image containing the complete three-dimensional coordinates for each resolved spatial point. If a time of flight is also taken into account in addition to the three-dimensional coordinates, this can be referred to as four-dimensional coordinates. LIDAR systems can be used in a multiplicity of applications, which means no fundamental difference or no limitation, however, for the concept described below. In a non-limiting embodiment, LIDAR systems are used for vehicles.

LIDAR systems typically operate with infrared wavelengths in the range of $850\ nm<\lambda<1600\ nm$, although this is not necessary in principle. The possible LIDAR systems can be differentiated abstractly on the basis of the way in which the image resolution is represented. The resolution can be represented either exclusively by way of an angle-selective detector, an angle-selective emitter or by means of a combination or cooperation of both systems.

A LIDAR system which produces its resolution exclusively by means of the detector is often referred to as "flash" LIDAR. It has an emitter, which illuminates the entire predefined or preset field of view (FOV) as homogeneously as possible. In this case, the detector has a plurality of individually readable segments arranged in a matrix. An optical unit that images different solid angle segments onto the individual segments is required for this purpose. This type of LIDAR system is often referred to as "flash" LIDAR. Often this also denotes just the corresponding LIDAR sensor.

In contrast thereto, a scanning LIDAR system has an emitter, which emits the measurement pulses in different spatial directions in a targeted manner, although this has to be done sequentially in time. A single segment in combination with an optical unit that images the entire field of view of the LIDAR system thereon suffices here as detector. A mixed form is the combination mentioned, or the cooperation mentioned above, in which a scanning movement is effected in one dimension, but the resolution in the second dimension is achieved by means of a detector that is angle-selective in this dimension. This can also be referred to as a hybrid scanning LIDAR system or hybrid scanning LIDAR sensor.

A light emission device could be a system composed of LED elements with a diaphragm. Ultrasonic or radar signals should also be understood as light emission device in this concept.

In a non-limiting embodiment, the words "light emission device" are taken to mean a laser scanner system, in particular a LIDAR sensor. An infrared laser (IR laser diode) used here is distinguished by a good collimation of the emission radiation. The method includes the following method steps. Firstly, a spatial region to be detected in the surroundings of the light emission device is predefined. In many cases, this is already implemented in the light emission device during production thereof, for example by means of a corresponding programing. In this regard, by way of example, a LIDAR system from the factory has a specific detection range. The predefined spatial region is scanned by light beams being emitted by the light emission device in different spatial directions.

The different spatial directions can be described by various coordinate systems. Polar coordinates, that is to say angle-related coordinates, are used in most cases. However, the spatial directions can also be defined by means of a Cartesian coordinate system, that is to say with x- and y-components. The use of spherical coordinates or other coordinate systems is also conceivable, in principle. Switching over different coordinate systems can also be expedient and be implemented depending on the type of use of the LIDAR system.

The control unit drives the emitter on the basis of a random component, as a result of which the emitter emits light beams in the direction of the scanning unit at random points in time. The scanning unit deflects the light beams in the different spatial directions along which the light beams leave the light emission device. In other words, the light emission device emits light beams in the direction of a random spatial direction after each time step.

The points in time at which light beams are emitted are temporally random, which means that the points in time at which the emitter emits light beams are stochastically or randomly distributed and do not form any recognizable regular pattern. Time step is taken to mean the time difference between two directly successive light pulses or between two directly successive light beams, wherein the time difference can be determined on the basis of the points in time at the beginning of two directly successive light pulses, from one light peak to directly the next light peak or other predefined states of the light.

If the light emission device ejects a light pulse every second for example (for simplification here the "light ejection" requires virtually no time), then the time step would be one second. A new directly succeeding random point in time at which a light beam is emitted arises after each time step. The temporal length of the individual time steps can be irregular, partly random or completely random.

In this context, the term "random" primarily relates to the temporal stochasticity of the emitter. The cooperation of the emitter with the scanning unit has the consequence that the light beams are emitted in different spatial directions, and this can likewise be referred to as "random" or "stochastic".

By way of example, provision can be made for the scanning unit to change its orientation with respect to the emitter at specific points in time or for the emitter to illuminate a different subregion of the scanning unit with a different orientation after each point in time. This results in each case in a different deflection of the light beams by the scanning unit and thus random scanning of the surroundings of the light emission device.

If a range of 0 to 20 degrees is intended to be scanned, for example, then this method does not involve scanning systematically from 0° to 20°, rather the light emission device in each case emits light beams in different, stochastically determined, spatial directions after each time step, or at the directly succeeding point in time. The order of the spatial directions in which the light emission device emits the light beams includes at least one random component, namely the emission of light beams by the emitter at random points in time. Consequently, the scheme with which the light emission device scans the surroundings will be random to a certain degree. This random scan can also be referred to as stochastic scanning or random scanning. In German the term Abtasten means scanning but instead it is likewise possible to use the terms Abscannen, Abrastern, Ablichten or other conceptually related synonyms. They all mean the same.

This scanning with at least one random component enables so-called aliasing artefacts to be avoided or at least partly reduced. Aliasing artefacts can arise if the Nyquist-Shannon sampling theorem is violated.

By way of example, in the case of a sinusoidal oscillation, if only the wave peak were always picked up by way of an unfavorable measurement frequency, then a constant measurement signal would arise for a sensor, even though the reality would be a sinusoidal oscillation. This example shows that a distorted picture of reality could be recorded under unfavorable circumstances when scanning the surroundings. However, if the scanning is effected at least partly stochastically, as outlined in the method steps, then the case where unfavorable measurement would always be carried out would be precluded de facto. Beat and stroboscopic effects can also be effectively prevented or reduced by means of the partial stochastic scanning by the light emission device. Furthermore, it is possible to configure the scanning by means of the random component in the algorithm in such a way that objects having a higher probability can be detected more rapidly.

A further configuration provides for in addition to the random component, the control unit to use a deterministic component to drive the emitter. It is thus possible to produce a scanning function for a drive method by which the control unit drives the emitter, which function additionally has a random component besides a systematic or deterministic component. In this variant, a random clustering of the scanned points of the surroundings can be effectively prevented. Theoretically, in the case of a purely random scanning scheme for the surroundings of the light emission device, it would be possible for all the scanning points to become concentrated on a small region. In order to completely preclude this "residual risk" of clustering, it can be expedient to perform the scanning scheme not just purely randomly, but in combination with a deterministic component. The advantages of systematic and random scanning of the surroundings can thus be combined. A situation in which excessively large regions are completely omitted during the scanning of the surroundings of the light emission device can thus be effectively prevented. It is thus possible to prevent large blind spots from being able to arise.

A further embodiment provides for the random component to be determined on the basis of a true random number and/or a pseudo-random number. Pseudo-random numbers can be determined by means of pseudo-random number generators. Pseudo-random number generators can have recourse to Fibonacci series. In particular, a so-called Fibonacci generator can be used to determine pseudo-random numbers. The Fibonacci generator includes a specification which generates a further number, the so-called pseudo-random number, from two starting values. It is also possible to use other mathematical methods such as, for example, the linear competition method, the middle-square method, the Hewlett-Packard method or the D.H. Lehmer method. This affords the advantage that random numbers or pseudo-random numbers can be generated in a simple manner. With this method, pseudo-random numbers can be generated with few computational resources, that is to say for example by means of a pocket calculator or a computer chip. Roughly speaking, pseudo-random numbers can be generated by means of mathematical methods.

Furthermore, the random component can be determined on the basis of a true random number. For generating the latter, physical random number generators are suitable, in particular. Such physical random number generators can be based on various physical effects. In this regard, by way of example, thermal noise of a resistor or a radioactive decay process may be the basis of the physical random number generator. A resistor, for example, does not always have exactly the same resistance value; said resistance value is subject to certain fluctuations. These fluctuations can be taken into account when generating random numbers with the aid of the physical random number generator.

It is thus possible to couple the generation of random numbers to physical reality. In the case of a mathematical method that generates pseudo-random numbers, the generation of pseudo-random numbers might no longer be reliable enough for example in the event of a defect of a computer chip. Physical fluctuations such as, for example, the noise of the resistor or the fluctuations of Earth's magnetic field are always independent of computers or the stored algorithms and thus random per se.

Other physically measurable variables such as, for example, distances between the light emission device and other objects, disturbing radiation from other objects, can also be used to generate true random numbers for the random component.

The emitter can emit light beams and the scanning unit can deflect said light beams in a different direction than the emitted light beams that leave the light emission device. The emitter can be any light source, in principle, but a laser scanner is used. The scanning unit can deflect the light beams by means of corresponding reflections. In a non-limiting embodiment, the scanning unit partly has a planar surface in order to enable a targeted reflection. Under certain circumstances, the scanning unit can also have surfaces which are curved in a defined manner regionally, which results in a different reflection than in the case of a planar surface. That is to say that the light beams impinge on the scanning unit and the direction of propagation of said light beams is changed by corresponding reflection. The scanning unit can be embodied in particular as a MEMS mirror system (MEMS=Micro-Electro-Mechanical system). MEMS mirrors can oscillate resonantly or non-resonantly in one axis or in two axes. A MEMS mirror system can also consist of a plurality of individual MEMS units. MEMS mirror systems can also be arranged sequentially, wherein the first MEMS unit oscillates about an axis oriented horizontally, for example, and directs the light beams being reflected onto a second MEMS system, the oscillation axis of which is oriented orthogonally to the first oscillation axis. With such a two-stage arrangement, a predefined area can be completely scanned (e.g. according to a Lissajous method). Instead of a MEMS mirror system, the scanning unit can additionally or alternatively have so-called micromirror actuators (DMD=digital mirror device). DMD mirror units can have two defined discrete orientations and undergo transition from one position to the other.

In this case, the MEMS mirrors or the scanning unit are/is configured such that the light beams reflected thereby leave the light emission device. Objects in the surroundings of the light emission device can thus be scanned by means of the emitted light beams. The generation of the light beams and the emission of the light beams in different spatial directions can thus be separated. That is to say that in this variant the light emission device is subdivided into two functions. The emitter fulfills the first function, namely providing light beams at random points in time. This is realized by means of the control unit, which makes use of the random component. The scanning unit or the mirror units (MEMS mirrors) make(s) it possible to emit said light beams in different spatial directions. It is thus possible for the scanning of the surroundings of the light emission device to be configured more flexibly.

One specific embodiment provides for the scanning unit to have a plurality of mirror units and the control unit to drive the emitter on the basis of a further random component in such a way that the emitter illuminates a randomly selected mirror unit by emitting light beams at random points in time. In this example, the scanning unit has many small mirror units, the MEMS mirrors and/or DMD mirrors. Said MEMS mirrors can be arranged in an array. The emitter is controlled by the control unit such that the emitter randomly selects an individual MEMS mirror and irradiates it with a light pulse. In this case, the respective MEMS mirror which would be illuminated by the emitter would be selected randomly by the further random component. The further random component includes two aspects.

Firstly, the emitter emits light beams at random points in time; secondly, a mirror unit of the scanning unit is selected randomly after each time step. Both aspects can be realized here by means of pseudo-random numbers and/or true random numbers. Since each individual mirror unit can be oriented differently, the random illumination of the mirror units would also result in a random scanning of the surroundings of the light emission device. The individual mirror units are embodied as movable. However, it is also possible to use mirror units which do not change their position relative to the emitter. In this case, it is expedient to provide enough mirror units which each cover a small spatial region outside the light emission device. Overall, the totality of the mirror units should cover any spatial region, such that excessively large gaps do not arise during the scanning.

If the scanning unit is constructed for example with a plurality of MEMS mirrors in a manner similar to a checkerboard, then in this example the emitter would not systematically illuminate the checkered pattern of the MEMS mirrors from left to right or from top to bottom. The control unit would drive the emitter in such a way that the emitter randomly illuminates for example firstly the fifth MEMS mirror, thereafter the $23^{rd}$, the $45^{th}$, etc., MEMS mirror. These MEMS mirrors are oriented differently and the light beams would thus be emitted in each case in different spatial directions. The respective MEMS mirrors are oriented in such a way that the light emission device can scan different angular ranges.

One particular further variant provides for the scanning unit as a result of its own movement, to change its relative orientation with respect to the emitter at predefined points in time. The predefined points in time can also correspond to the random points in time. That is to say that, in this example, the emission of light beams from the light emission device after the deflection by the scanning unit does not take place according to a fixedly predefined time pattern, rather the emission of the light beams takes place at different random points in time. The points in time of the light emission are unforeseeable, that is to say random, on account of the random component. Since the scanning unit or else the respective mirror units in this example move(s), different points in time of the emission of light beams by the emitter in the direction of the scanning unit ultimately result in different spatial directions of the light beams that leave the light emission device. This is owing to the fact that the scanning unit moves and thus reflects light beams in different directions. The emission of the light beams from the light emission device can thus be configured randomly with regard to the spatial directions.

Since, in this example, the scanning unit or the mirror units regularly change(s) its (their) orientations, correspondingly different reflection angles arise as well. That is to say that the reflection angle of the scanning unit or of the individual mirror units changes over time or is dependent on time. Since this movement of the scanning unit or of the respective mirror units can be configured randomly only with very great difficulty or not at all, a random emission of light beams is effected by the emitter. A random scanning of the surroundings by means of the emitted light beams can thus ultimately be achieved. In addition, it is also possible to combine this variant with the variant mentioned previously. That is to say that the emitter not only emits light beams at random points in time but also in this case irradiates different mirror units of the scanning unit in a randomly selected manner. On the basis of a random number (true random number or pseudo-random number), after each time step, a different mirror unit could be selected, which continuously changes its relative position with respect to the emitter for example on account of its own movement. This mirror unit selected on the basis of the random number would be irradiated by the emitter. Thus, the effect of the stochastic scanning besides the random temporal emission of light beams in combination with the deflection by the mirror units or scanning unit would also additionally be realized "doubly" by way of a mirror unit selected on the basis of the random number.

A further variant provides for the sensor system to have a detector, which receives reflections of the emitted light beams. In this case, a light emission device is expediently supplemented by a detector. Light beams reflected by an object can thus be received again by the sensor system by means of the detector. The random scanning of the surroundings of the light emission device by the light beams being emitted into randomly determined angular segments is also manifested in the information received by the detector. The detector or an optical unit arranged therein gathers the reflected light signals within its field of view (FOV). The random scanning of the surroundings of the light emission device can thus be detected and stored. The information thus obtained can be supplied for an evaluation in the further course of the procedure.

A further variant provides for an overall image to be generated by means of a deconvolution on the basis of the light beams received by the detector. Deconvolution denotes the reversal of the so-called convolution operation. This is a mathematical transformation which finds application in signal and image processing, inter alia. With the aid of a deconvolution, the pixel profile received by the detector can be improved further with regard to its resolution. For this purpose, however, the spot shape, the shape of a pixel in the far field, that is to say at an object to be scanned, has to be known sufficiently accurately. This is known in most cases. During the production of a laser scanner or LIDAR sensor, the shape and type of the light beams used are known. The way in which these light beams behave at a distance is also known. A laser beam, for example, is generally directional and hardly divergent. In the case of other light sources, the corresponding light beams diverge conically. Consequently, a pixel in the far field, the spotlight, is known and this information can be taken into account accordingly during a deconvolution. This can help to generate an overall image of better resolution from the information received.

Another variant provides for an overall image to be generated by means of a calculation of mean values or median values on the basis of the light beams received by the detector. Since the scanning or detection of the surroundings of the light emission device can be effected at least partly randomly, specific spatial regions may have been scanned a number of times. That is to say that a plurality of measurement results may be present for a specific spatial region. Since each individual measurement is beset by a certain fluctuation, the fluctuations or noise of the respective measurement points can be reduced by multiple measurement of the same spatial region. Given a correspondingly high number of measurement points, the noise would average out and the true measurement value would increasingly be revealed. However, if the noise is small in relation to a measurement variable, then the measurement variable can also be determined without mean or median value formation.

A further variant provides for the light emission device to emit pulsed light, such as in the wavelength range of 850 nm<$\lambda$<1600 nm. A wavelength of 905 nm can be provided by semiconductor laser diodes, for example. Silicon-germanium semiconductors are particularly well suited to this. They have the advantage that semiconductors of this type are inexpensive to produce. A gallium arsenide semiconductor can provide laser light in the wavelength range around approximately 1500 nm. This wavelength lies in the distinctly non-visible range of the human eye and such laser light has a lower energy density. However, laser diodes based on gallium arsenide are significantly more expensive.

A further variant provides for at least one subregion to be defined on the basis of the reflected light beams in the predefined spatial region and to be thereupon examined by a second sensor system. That is to say that, in this variant, the light emission device detects at least one subregion by means of the random or stochastic scanning of the surroundings. Said subregion can thereupon be examined more closely by the second sensor system, particularly if an object was detected by a first stochastic scanning. It is thus possible, by means of the first sensor system, to make a rough (solid angle) preliminary selection, which can thereupon be considered more closely by a second sensor system. This is generally realized by a communication link being or having been set up between the two sensor systems. The two sensor systems can be, in particular, LIDAR systems in a single motor vehicle. The second LIDAR system could furthermore be arranged in a different vehicle. That is to say that the two LIDAR systems are arranged in different motor vehicles. The first LIDAR system could perform a first rough detection of its surroundings by means of a random scanning of the surroundings. For a further evaluation or an additional evaluation, the result of this scanning could be communicated to the second LIDAR system. In this case, a corresponding communication link would be set up between the two vehicles by the LIDAR systems. Such sensor systems e.g. in the form of a LIDAR system can be arranged at different locations on the motor vehicle. They can be arranged in a side region, a front region or a rear region of the motor vehicle.

Such a direct communication link between two vehicles is also known by the English term "car-to-car" (abbreviation: C2C) link. Moreover, it is possible for the first sensor system, which scans its surroundings by means of the random component, to communicate data to surroundings, for example to a server. In addition, the first LIDAR system can receive data from a server and take these data into account during the scanning and/or evaluation of the received light beams. That is to say that, in this variant, the random component that influences the scanning can be dependent on the result of a server request. The exact type of data transfer, e.g. Bluetooth, WiFi, mobile radio, etc., is important here only insofar as a reliable data transfer can take place. Provision can be made here, in particular, for the transferred information to be encrypted beforehand and thus to be transferred in an encrypted fashion. Objections in respect of data protection laws can thus be countered. In addition, the sensor system can be better protected vis-a-vis hacker attacks or attempts at manipulation.

A sensor system may include a light emission device including an emitter and a scanning unit, wherein the light emission device is configured to scan surroundings of the light emission device at least partly randomly. The sensor system is additionally configured to scan a predefined spatial region by emitting light beams in different spatial directions. The sensor system furthermore includes a control unit for driving the light emission device, wherein the driving is effected in such a way that the scanning is effected on the basis of a random component, as a result of which the emitter emits light beams in the direction of the scanning unit at random points in time, and the scanning unit deflects the light beams in different spatial directions along which the light beams leave the light emission device. The definitions and advantages mentioned in patent claim 1 are analogously applicable to this device claim. By virtue of the fact that the light emission device is configured to emit light beams, the light emission device can also be regarded as a transmitter or transmitting unit.

A further aspect of the invention provides for the control unit to have a random number generator in order to generate pseudo-random numbers and/or true random numbers for the calculation of the random component. The methods for calculating random numbers as outlined in the paragraphs above can be integrated in a computer chip of the control unit. Furthermore, it can be possible for the control unit to access an external computing unit in order to retrieve random numbers stored there. The control unit can be composed of a plurality of components, wherein one component here serves for calculating random numbers. Thus, the method for calculating random numbers is integrated in the control unit and the random scanning can be effected without delays. This is presumably significantly more efficient than carrying out the calculation of the random numbers outside the control unit. Delay-free operation of the light emission device can thus be better ensured.

The emitter can be configured, as a light source, to emit the light beams continuously or at specific and/or at stochastically determined points in time. That is to say that the emitter can emit a light beam continuously or emit light pulses or light beams at certain points in time. The scanning unit serves for deflecting the light beams emitted by the emitter. In order to realize this task, the scanning unit is embodied in particular as a reflective layer. This can be a mirror, for example. However, the scanning unit can be divided into a plurality of mirror units, the so-called MEMS mirrors. The advantages and explanations mentioned in respect thereof in the previous paragraphs are also analogously applicable to this device claim.

In a further variant, the sensor system may have a computing unit, which generates an overall image on the basis of light beams received by a detector of the sensor system. A classification of the detected objects, and hence object recognition, can be effected on the basis of the overall image. In this variant, a detector is part of the sensor system and is ideally arranged in such a way that it can receive the light beams reflected from an object. The detector can be regarded as a receiver or receiving unit for the reflected light beams. A provisional image or pixel pattern can be created on the basis of the received light beams. This information can be transformed to form an overall image by means of the computing unit. By way of example, the method of deconvolution, mean value formation or median value formation are suitable for this purpose. However, the computing unit can also have available other methods from image or signal technology in order to generate an overall image from the received light beams. Neural networks can also be used in this case.

One particularly advantageous variant provides for the light emission device to be a laser scanner, in particular a LIDAR system. In principle, the light emission device may include an LED element with a corresponding associated switched diaphragm. However, it is significantly more advantageous to use laser scanners or LIDAR sensors as light emission device. LIDAR systems find application in many technical fields, for example in the field of mobility. LIDAR systems usually have a range of up to approximately 300 meters, but may also have longer ranges in the future. Instead of laser scanners, however, radar sensors and/or ultrasonic sensors can also be used. However, they can also be used as auxiliary sensors.

A further variant provides a mobile means of locomotion including a sensor system. The term "mobile means of locomotion" denotes not just vehicles or other motor-driven objects. Mobile means of locomotion can also be bicycles, sleds, carriages, etc.

In one specific variant, a vehicle is provided as means of locomotion. The vehicle can be an aircraft or a waterborne vehicle or a landborne vehicle. The landborne vehicle can be a motor vehicle or a rail vehicle or a bicycle. In a non-limiting embodiment, the vehicle is a truck or an automobile or a motorcycle. The vehicle should be considered here to be, in particular, a motor vehicle or a car. A LIDAR system as sensor system has very great potential in the area of the automotive sector since LIDAR systems are very advantageous there with regard to autonomously driving vehicles. Such a sensor system can also be used in flying vehicles such as, for example, in a helicopter, "CityHawk", a flying car, a drone.

The vehicle can furthermore be an aircraft, for example a drone, or a waterborne vehicle, for example ships, submarines, or a landborne vehicle. The landborne vehicle can be a motor vehicle or a rail vehicle or a bicycle. The use of the LIDAR system in a truck, automobile or motorcycle is possible. The vehicle can furthermore be configured as an autonomous or partly autonomous vehicle.

Further fields of application can be, for example, spotlights for effect-light lighting systems, entertainment lighting systems, architainment lighting systems, general lighting, medical and therapeutic lighting, horticulture (plant illumination), etc.

In a further variant, the vehicle has a further means of locomotion, which is arranged on the vehicle in a stationary state and is not physically connected to the vehicle spatially in an activation state. This can be for example a drone arranged on a roof of a car. The drone could have the sensor system, for example. In the stationary state, the drone would be connected to the roof. This could be effected magnetically, for example. In this state, the drone could be used as a stationary Lidar sensor, wherein this Lidar sensor on the drone operates according to the method.

By way of example, if a region that cannot be reached by the vehicle is intended to be examined, then the drone can be put into an activation state. This means, in particular, that the drone detaches from the vehicle and begins to move independently. In other words, the drone flies away from the vehicle and can thus head for regions that are inaccessible to the vehicle. Since the drone in this example has the sensor system, in particular a LIDAR sensor, it can nevertheless examine regions that are inaccessible to the vehicle. This information, received by a detector arranged in or on the drone in this example, can be evaluated directly by the drone in one option, or this information can be transferred to a computing unit arranged in the vehicle. There the computing unit of the vehicle can evaluate the received information and create an overall image. It is thus possible to arrange the computing unit in or on the vehicle or at the drone.

This procedure is advantageous in the case of police vehicles, for example. Police vehicles are used, inter alia, in cases in connection with combatting crime, an industrial accident and/or a catastrophe situation. Scenarios may arise in which broken, confusing and, under certain circumstances, hazardous terrain is intended to be examined. In this case, it is extremely advantageous to use a drone having the sensor system instead of a human being. In this regard, information about an unknown region can be obtained without endangering human life.

BRIEF DESCRIPTION OF THE DRAWINGS

It should be noted here that the features outlined in conjunction with the figures can be realized not only in the feature combinations described, but also by themselves or in other technically expedient combinations.

Elements which are the same or of the same type, or which have the same effect, are provided with the same references in the figures. The figures are respectively schematic representations and therefore not necessarily true to scale. Rather, relatively small elements, and in particular layer thicknesses, may be represented exaggeratedly large for illustration.

Figure 1:
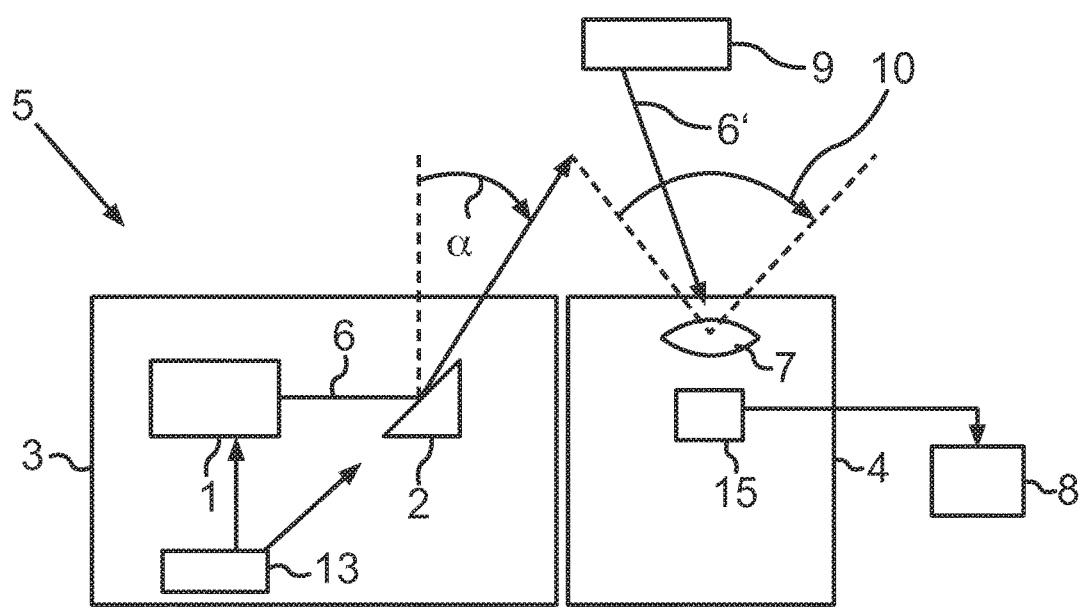
Figure 2:
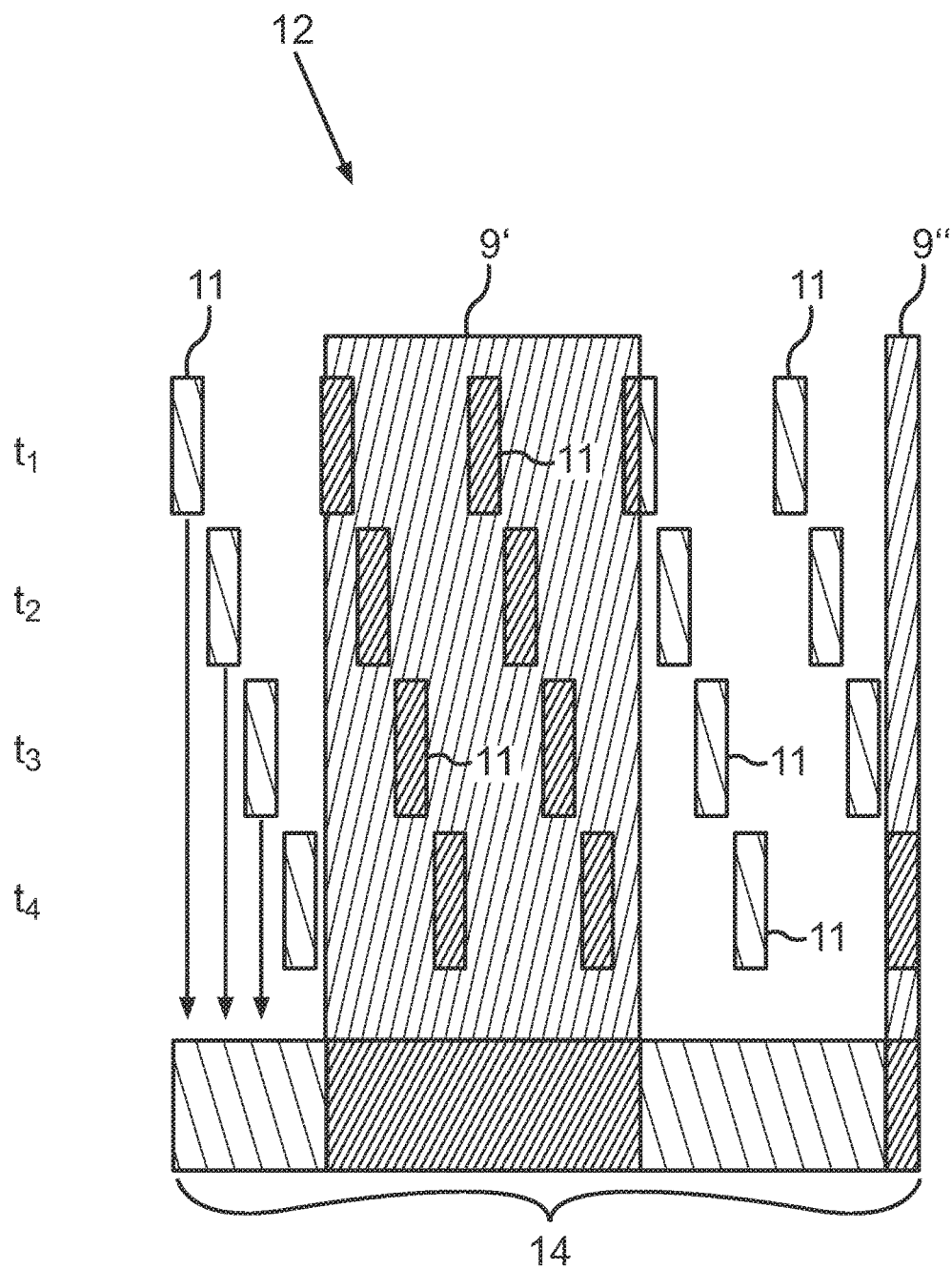
Figure 3:
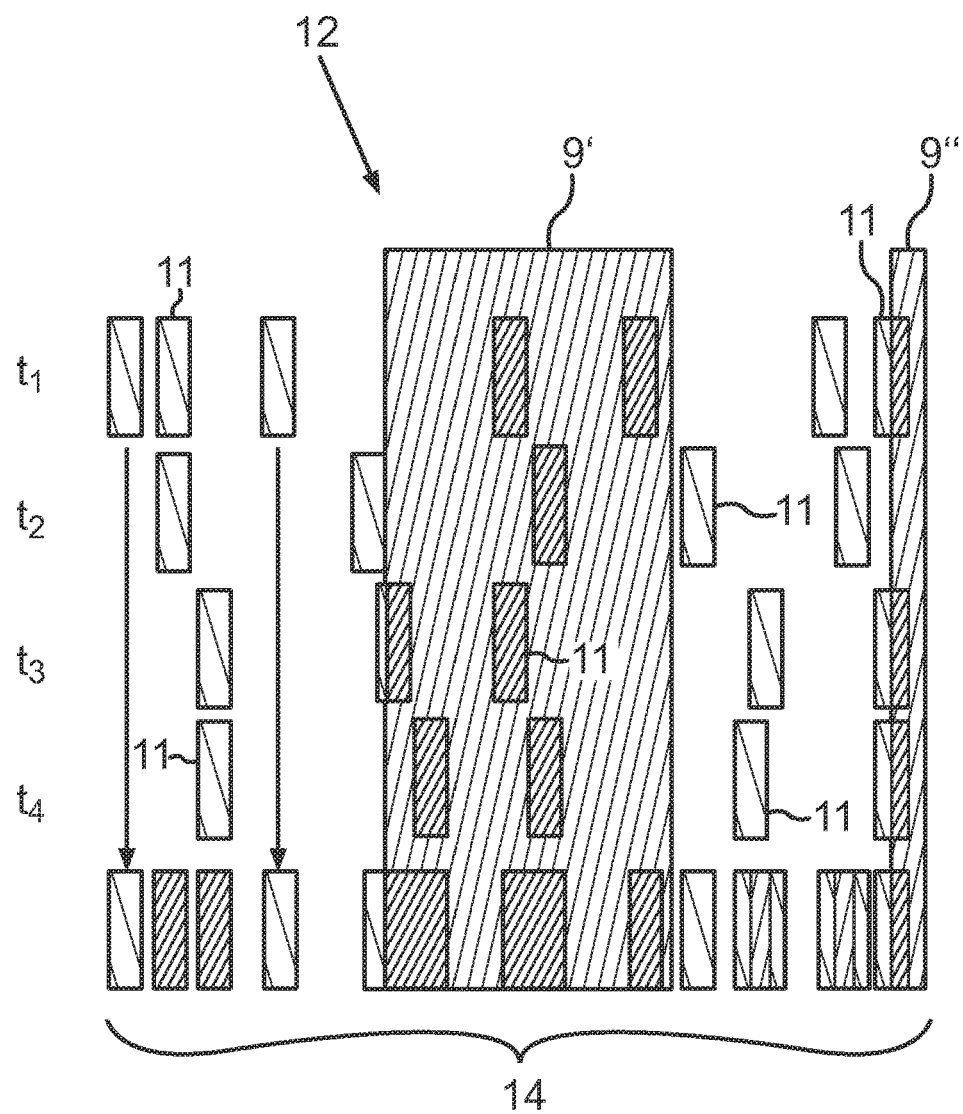

The figures will now be explained in greater detail:

FIG. 1 shows a schematic illustration of a sensor system including a light emission device and a detector and with an object in front of the sensor system;

FIG. 2 shows an exemplary scan image in accordance with systematic scanning of the surroundings of the light emission device; and FIG. 3 shows an exemplary illustration of a scan image in accordance with the partly random scanning of the surroundings of the light emission device.

DETAILED DESCRIPTION

FIG. 1 shows by way of example how a sensor system 5 can be constructed. The sensor system 5 includes a light emission device 3 and also a detector 4. Let an object 9 be arranged in front of the sensor system 5. The light emission device 3 can be realized technically in various ways. It can be embodied for example as a laser scanner, as a LIDAR scanner, as a radar scanner, as a light source with a diaphragm disposed in front, or as an ultrasonic scanner. The light source can be realized by an LED.

The LED can be present in the form of at least one individually packaged LED or in the form of at least one LED chip including one or more light emitting diodes. A plurality of LED chips can be mounted on a common substrate ("submount") and form an LED or can be secured individually or jointly for example on a circuit board (e.g. FR4, metal-core circuit board, etc.) ("CoB"=Chip on Board). The at least one LED can be equipped with at least one dedicated and/or common optical unit for beam guiding, for example with at least one Fresnel lens or a collimator. Instead of or in addition to inorganic LEDs, for example based on AlInGaN or InGaN or AlInGaP, organic LEDs (OLEDs, e.g. polymer OLEDs) are generally usable as well. The LED chips can be directly emissive or have a phosphor mounted in front. Alternatively, the light emitting component can be a laser diode or a laser diode arrangement. It is also conceivable to provide one OLED luminous layer or a plurality of OLED luminous layer or an OLED luminous region. The emission wavelengths of the light emitting components can be in the ultraviolet, visible or infrared spectral range. The light emitting components can additionally be equipped with a dedicated converter. Light sources that emit pulsed, ideally monochromatic, light are used. These are typically lasers, very particularly infrared lasers in the wavelength range of 850 nm to 1600 nm.

In this case, the light emission device 3 constitutes a LIDAR system. The light emission device 3 in this example includes an emitter 1 and also a movable scanning unit 2. The scanning unit 2, for its part, may include a plurality of mirror units. In the field of LIDAR technology, said mirror units are often embodied as MEMS mirrors. These MEMS mirror units are embodied as movable along at least one axis. A scanning movement in the horizontal direction can thus be achieved with the aid of the MEMS mirrors. The frequency implemented here, the so-called scanning frequency, is at least 2 kilohertz in the field of LIDAR technology. This frequency was selected arbitrarily in this example; generally it is very advantageous if the scanning frequency is high enough that the distances to surrounding objects 9 are quasi-static within a period. At a lower scanning frequency, a correct assessment of the image of the surroundings, especially of rapidly moving objects, in a downstream evaluation could become difficult.

In this respect, here is a brief consideration of the orders of magnitude: given a velocity or relative velocity of two objects 9 of v=130 km/h, approximately 36 m are covered per second, which in turn corresponds to a velocity of v=36 mm/ms=36 mm kHz. Since the accuracy of the distance measurement of a LIDAR system for vehicle applications is usually specified in the range of d±30 mm, the condition of the quasi-stationary state within a scanning period is satisfied sufficiently for scanning frequencies fR~1 kHz. For even more stringent requirements made of the measurement accuracy, the scanning frequency fR can be adapted toward higher values. The magnitude of a field of view 10 or viewing angle is unimportant for the discussion.

Furthermore, this example is based on an idealized, linear trajectory of the mirror, although in a real system this will be possible only in a subrange of the scanning angles. However, this makes no difference, in principle, for the inventive concept since a nonlinear mirror trajectory can fundamentally be corrected by adapting the pulse timing, for example in the case of stochastic clocking of the measurement pulses by means of a superposition of an analytical function and a random number or—in the case of a pure random number as clock source—by means of a scaling of the normalized random variables that is synchronous with the trajectory. That is to say that a control unit 13 can emit the light pulses in a temporally controlled manner. This temporal control by the control unit 13 can be effected in particular in accordance with the superposition mentioned.

The emitter can be a single unit, which radiates or emits light beams, light pulses or photons. However, the emitter 1 can also be composed of a plurality of individual emitters 1. In this exemplary embodiment, each individual emitter 1 is driven with a pulse rate of 10 kilohertz. This pulse rate is a constant determined by the thermal loading capacity of the emitter. It is very advantageous to maintain this pulse rate on average since otherwise the emitter 1 could be detrimentally affected by excessively high thermal stresses. What is crucial here is maintaining the pulse frequency on average, that is to say that instances where this pulse frequency is momentarily exceeded are nevertheless possible. However, it may be necessary to constrain a minimum dead time. That means that the pulse frequency can have a limit value that must not be exceeded. Such a limit value could be 40 kilohertz, for example.

The emitter 1 emits light beams 6 or measurement pulses. The frequency of the emitted measurement pulse per unit time is specified by the pulse frequency. Besides the pulse frequency or pulse rate, the pulse duration or pulse length may also be important. It is between 1 ns (nanosecond) and 100 ns in most cases. LIDAR systems often have a pulse length of approximately 10 ns. However, the pulse length or pulse shape is not relevant.

In this example, the control unit 13 can drive both the emitter 1 and the scanning unit 2. The control unit 13 can have the effect, for example, that the emitter 1 emits light beams 6 at points in time which are unforeseeable, that is to say are random. Since, in this example, the scanning unit 2 or the associated MEMS mirrors is/are embodied as movable and move(s) continuously, for the emitted light beams 6 this has the effect that said light beams 6 are deflected by the scanning unit 2 in different spatial directions, that is to say in particular into not completely foreseeable solid angles α. Since the light beams 6 are emitted by the emitter 1 in combination with the scanning unit 2 in a random manner, a random spatial distribution of the light beams 6 that were deflected by the scanning unit 2 also results. Ideally, the movements of the respective mirror units, of the MEMS mirrors, are implemented such that different solid angles a are covered by the deflected light beams 6. As a result, a random scanning pattern would arise even in the case of a single MEMS mirror that moves continuously. The light beams 6 would leave the light emission device 3 in a random manner at unforeseeable solid angles α.

The random emission of the light beams 6 into different solid angles α can also be effected by way of a random irradiation of different mirror units of the scanning unit 2.

If mention is made of random emission or scanning, this is taken to mean that the light beams 6 leave the light emission device 3 in different spatial directions and at the same time the spatial directions along which the light beams 6 move can change randomly. Thus, a predefined spatial region is intended to be scanned at least partly stochastically, rather than completely systematically. If a plurality of MEMS mirrors or DMD mirrors are present which move differently with respect to one another or are arranged differently with respect to the emitter 1, then it is possible to achieve random scanning of the surroundings as follows.

The control unit 13 drives the emitter 1 such that the latter emits light beams 6 at random points in time. Said light beams 6 impinge on the scanning unit 2, which moves relative to the emitter 1 or changes its relative position with respect to the emitter 1 at specific points in time. The scanning unit 2 or the MEMS mirrors could oscillate, for example. In this case, this oscillation could also take place along a plurality of axes. As a result, the light beams 6 can be emitted in random spatial directions. Scanning with a random component would thus result. In addition, the scanning unit 2 can be composed of a plurality of MEMS mirror units. In this example, the emitter 1 is driven by the control unit 13 such that the emitter 1 selects a MEMS mirror randomly for irradiation. In this case, the respective MEMS mirrors have different orientations. That is to say that, in this example, a random selection of MEMS mirror units results in random spatial directions of the light beams 6 that leave the light emission device 3.

That is to say that, after each time step, a different MEMS mirror unit of the scanning unit 2 can be illuminated by the emitter 1. The sequence of the illuminated MEMS mirror units here can also be implemented randomly, in particular. The random scanning of the surroundings of the light emission device 3 can thus be effected firstly by means of a random time sequence having a random distribution of points in time at which the emitter 1 emits light beams 6. As a result of the scanning unit 2 carrying out its own corresponding movements, the light signal emitted at random points in time or the emitted light beams 6 is/are then deflected in random spatial directions, in particular at different solid angles α. The random scanning of the surroundings can additionally or alternatively be effected by the control unit 13 driving the emitter 1 such that the latter irradiates different mirror units after each time step.

By virtue of the fact that, in the case of the scanning unit 2 having a multiplicity of MEMS mirrors in an array, for example, it is not known which MEMS mirror will be illuminated at the next point in time, random scanning of the surroundings of the light emission device 3 thus results.

In FIG. 1 the sensor system 5 includes a detector 4 besides the light emission device 3. Said detector 4 in turn includes an optical unit 7 with a downstream light sensor 15, and also a computing unit 8. In this example, the optical unit 7 fulfills the function of a receiver. The light sensor 15 is sensitive to visible light, in particular, but can also perceive IR light and/or UV light. The light beams 6 deflected by the movable scanning unit 2 impinge on the object 9 via random solid angles α. Said light beams 6 are at least partly reflected at the object 9 and the reflected light beams 6' can reach the optical unit 7 over the field of view 10 of the detector 4. The reflected light beams 6' registered by the optical unit 7 can be combined as a scan image 12 and can be evaluated and processed further by the computing unit 8.

The sensor system 5 shown in FIG. 1 can be embodied in particular as a LIDAR system used in conjunction with a vehicle. In this case, a drone can be arranged on the vehicle, said drone including the sensor system 5. Such a drone could be activated, detach from the vehicle and independently perform measurements in regions which cannot be reached by the vehicle. In this case, provision can be made for the drone to have a communication interface by means of which the information obtained from the measurements can be transferred to the vehicle. In this case, a corresponding communication interface is likewise present on the vehicle. With the aid of these communication interfaces, it is also possible to receive data from other external LIDAR systems or networks. Data can likewise be transmitted to other LIDAR systems or networks. The principle of the random scanning of the surroundings using light beams 6 can afford various advantages. One advantage is that so-called aliasing artefacts are effectively prevented, but at least significantly reduced. This becomes particularly clear with reference to FIGS. 2 and 3.

FIG. 2, which illustrates the prior art, shows the scan image 12 having a plurality of reflected pixels 11. Four successive points in time, namely t1, t2, t3 and t4, are illustrated in this example. At these points in time t1, t2, t3 and t4, the detector 4 registers different image points 11. In this example, the intention is for a bridge pier 9' to be arranged in the center and a traffic sign 9" to be arranged further to the right. At the point in time t2, different image points 11 are likewise registered by the detector 4. It is readily discernible that, at the point in time t2, the registered image points 11 are shifted toward the right by one pixel unit. At the point in time t3, the image points 11 are once again shifted toward the right by one pixel. This analogously applies to the point in time t4 as well. At the point in time t4, the image points 11 are shifted toward the right by three pixels. That is to say that in this example the surroundings were scanned according to a deterministic, fixedly pre-defined scheme. A scanning was started at the point in time t1, which scanning was shifted toward the right by one pixel at each point in time t1, t2, t3 and t4. The information gathered can be combined after the fourth point in time t4. This could if necessary also be done at an earlier point in time. This combination is indicated by the arrows in the left-hand region and produces an overall image 14. As is evident, the bridge pier 9' is recognized reliably at each point in time t1, t2, t3 and t4. Since the bridge pier 9' is relatively wide in comparison with the traffic sign 9", a detection of the bridge pier 9' is possible more easily than the detection of the traffic sign 9". However, it is also clearly discernible that the traffic sign 9" is not detected until at the point in time t4.

If, in the example in FIG. 2 (prior art), in this case the scanning of the surroundings had already been terminated after the third point in time t3, then the traffic sign 9" would not have been detected at all. A plurality of scenarios and cases can occur in which a systematic scanning of the surroundings reliably recognizes the object 9 only after a sufficiently large number of time steps. By way of example, if a car scanned its surroundings systematically from left to right, then an object 9 situated at the right-hand edge would be detected only at the end of the scanning process. In the case of time-critical processes, such as in the case of recognition of pedestrians, for example, such a temporal delay may have considerable consequences. If the scanning is effected according to a systematic scheme and if this scheme has a systematic error, then this error would also be manifested in the form of objects 9 recognized too late or not recognized.

In contrast to FIG. 2, FIG. 3 shows a scan image 12 that was generated from the surroundings of the light emission device 3 by scanning them with a random component. The distribution of the respective image points 11 does not follow a fixedly predefined pattern in this case. However, in order to avoid a scanning which is restricted only to a specific subregion, it may be expedient to combine the random component with a deterministic component. This makes it possible to prevent a situation in which, in the case of a purely random scanning, so-called clustering takes place and certain larger regions are not scanned at all. So-called "white or blind points" can thus be prevented. In the example in FIG. 3, both objects, the traffic sign 9" and the bridge pier 9', are already detected at the point in time t1. Although the complete extent of the respective objects 9 is not yet known at the point in time t1, on the basis of the detected image points 11 it can be deduced that the object 9 is present in the right-hand region of the detection region. This did not take place until at the point in time t4 in the example in FIG. 2. This random scanning also makes it possible to prevent so-called aliasing artefacts from occurring in the scan image 12 and in the later overall image 14. This would be possible, for example, if, in the case of a walking pedestrian, the sensor system 5 only ever scans the interspace between both of the pedestrian's legs as a result of the systematic scanning. This example illustrates the principle of the aliasing artefacts, as described above.

Randomly scanning the surroundings could effectively prevent a situation in which, in the example of the pedestrian walking past, only the interspace between the pedestrian's legs would ever be detected, meaning that the pedestrian would remain unrecognized by the sensor system 5. The pedestrian walking past can be recognized with higher probability by means of the scan image 12 in accordance with FIG. 3. In addition, as is shown in FIG. 3, specific regions can be detected a number of times by means of the random scanning of the surroundings of the light emission device 3. In this case, a higher resolution can be generated at some points. The signal-to-noise ratio can be improved by means of a mean value or median calculation. It is thus possible, already at an earlier point in time, to read out images which however already cover the entire field of view 10, albeit with gaps. This can be greatly advantageous in the case of time-critical recognition of objects 9, such as, for example, children or in the case of pedestrians. A time-critical measurement or recognition of objects 9 can be present in particular if the distances to the object 9 are small and/or the object 9 is moving rapidly and/or the transmitting vehicle is turning or rotating rapidly, for example during tight cornering or during a U-turn maneuver.

If the at least one object 9' or 9" has been detected and/r recognized, then an object classification can be carried out in order that, for example, a vehicle equipped with the sensor system 5 is then controlled in a simple manner for example depending on the object class. If a motor vehicle is equipped with the sensor system 5, for example, then it can recognize the bridge pier 9' and also the traffic sign 9". Furthermore, the object classification, which can be realized by the computing unit 8, can recognize the type of traffic sign 9" and the content thereof. In this regard, it is possible, for example, for the computing unit 8 to recognize that the traffic sign 9" indicates a speed limitation and to detect the speed limit value. This information can be communicated to some other controller of the motor vehicle in the further course of the procedure.

In a non-limiting embodiment, a plurality of object classes are provided in the case of the object classification, wherein a detected object is then classified in one of the object classes, in particular by the computing unit 8 or a data evaluation unit. This has the advantage that the data evaluation unit or computing unit 8 does not have to identify objects anew every time. Advantageously, a specific vehicle regulation can then be kept available for a respective object class. By way of example, provision can be made of a super-object class provided for objects, such as for the traffic sign 9", which move within a specific circle or sector or radius—proceeding from the current location of a vehicle—and/or are arranged in a stationary manner. The recognition of traffic signs 9" and also the detection of their respective information content can thus be accelerated.

Furthermore, provision can be made of a further super-object class provided for movable objects which move in a larger movement radius or larger radius or larger circle or larger sector in comparison with the second object class. It goes without saying that even further object classes can be provided. The data evaluation unit and respectively the computing unit 8 can thus be used for object recognition and object classification.

Such a sensor system 5, embodied as a LIDAR system, can be suspended on the vehicle or be integrated in a headlight. The sensor system 5 is arranged in the front region of the vehicle. An effective object detection in the direction of travel is thus possible. However, sensor systems 5 can also be arranged laterally or at the rear on the vehicle, and also at the top on the vehicle roof. Cooperation of all the sensor systems makes it possible to generate a panoramic image. The detector 4 can be embodied in the form of a single detector or in combination with a plurality of detectors. The emitter 1 can likewise be embodied as a single emitter or as a combination of a plurality of individual emitters 1. A plurality of individual emitters 1 can be arranged in the shape of a line in a vertical direction. A plurality of emitters 1 can be arranged one above another within the light emission device 3. In this regard, by way of example, four individual emitters 1 can be arranged one directly above another, such that the four emitters 1 form a straight line.

The arrangement of a plurality of emitters 1 can also be embodied horizontally. In the case of a vehicle, by way of example, a plurality of individual emitters 1 could be arranged along the fender. They can be arranged for example in the region of a left headlight, a right headlight and therebetween. In this case, it is not absolutely necessary for the emitters 1 to be positioned at the same height. In particular, the emitters 1 can be arranged along the fender or below the latter. It is also possible for a plurality of emitters 1 to be positioned horizontally next to one another in the light emission device 3. Here, too, it is not absolutely necessary for all the emitters 1 to have the same geodetic height. By way of example, if four individual emitters 1 are arranged along the fender on a vehicle and they are driven temporally sequentially with respect to one another, then the detector 4 can generate a resolution of four pixels therefrom. That is to say that each individual emitter 1 could be assigned to a specific height. It would thus be possible, on the basis of the reflected light beams 6', additionally to extract further spatial information, the vertical height, besides the angle information.

If a plurality of emitters 1 are combined with one another, then they can be clocked synchronously with one another, but randomly relative to the scanning movement. As a result, quadruple the emitter capacity is available per addressed solid angle α, which correspondingly increases the detection range of the sensor system 5.

The four emitters 1 mentioned by way of example can also be clocked with a temporal offset with respect to one another. The time intervals between the individual light pulses within this group of four including four individual emitters 1 can be chosen to be constant and can also be chosen to be random. In both cases, the dead time, that is to say the time interval until the next transmission pulse, of an individual emitter 1 after the emission of a light beam 6 can be reduced at the system level. In this example, the dead time would be reduced by the factor 4 since a group of four emitters 1 is present here.

These two operating modes of the sensor system 5 illustrated by way of example can also mutually alternate in the course of operation. In this regard, by way of example, at high speeds, it is possible to increase the detection range or, by way of example, in dense traffic, it is possible to increase the resolution in the case of small distances. As a result of an intelligent, in particular object-distance-based, control of the control unit 13, it is possible to switch between these two operating modes in an expedient manner. In conjunction with the computing unit 8, on the basis of the information obtained by the receiver 7, the overall image 14 can be generated, which first provides a low-resolution image at a large distance or calculates an image having a higher resolution in the region in proximity to the vehicle. That is to say that, depending on the requirement, provision could be made of either a weakly resolved image from the distance or a better resolved image from the region in proximity to the vehicle or the sensor system 5.

The light emission device may include a so-called Lissajous scanner. A Lissajous scanner is a scanning mirror that is operated in a resonant or non-resonant manner in both axes. The movement curve of each axis is thus sinusoidal; the trajectory of a light beam 6 deflected thereby thus forms Lissajous patterns. These Lissajous patterns have the property that not every solid angle α is attained with equal frequency. In conjunction with the stochastic clocking of the measurement pulses or the light beams 6, here the possibility would be afforded of choosing the distribution function of the random numbers such that the illumination of the field of view 10 that is not uniform on average over time could be compensated for by a Lissajous scanner.

One particular advantageous form results if the sensor system 5 is combined with a second sensor system. The first sensor system 5 functions in particular in accordance with the random principle based on the random component. That is to say that the sensor system 5 scans its surroundings by means of a random emission of light beams 6 at randomly occurring solid angles α. Here the case can occur that objects 9 are detected earlier than in the case of a systematic scanning of the surroundings. In the example in FIG. 3 it was ascertained as early as at the point in time t1 that two objects 9, namely the bridge pier 9' and the traffic sign 9", are situated in the field of view 10 of the detector 4. This information, that is to say the detected positions of the detected objects 9, can then be communicated to the second sensor system. On the basis of this, the second sensor system can separately scan the spatial subregions supplied by the first sensor system 5. That is to say that the second sensor system does not scan the complete field of view 10, but rather only the subregions of the field of view 10 that are predetermined by the first sensor system 5. The second sensor system can provide in particular a systematic scanning of the subregions which is thus not, or substantially not, based on a stochastic time sequence.

It is thus possible to accelerate an object recognition. This is particularly advantageous in the case of vehicles. In the case of high speeds of vehicles or in the case of objects occurring close to the vehicle (for instance in a range of within 10 meters) it is extremely advantageous to recognize objects 9 as rapidly as possible. In this regard, by way of example, in the context of driving along a street within a village or town, a ball or a child suddenly appearing from the side could be detected more rapidly. Since autonomously driving vehicles will presumably initiate at least a strong braking maneuver in such a case, it is very important for this dangerous situation to be recognized as rapidly as possible by the sensor system 5. Even a few fractions of a second could be decisive in determining whether or not an accident would occur in this situation. The embodiment provided in this paragraph could recognize the suddenly appearing ball or child in a timely manner at least in a rough way. In this example, the second sensor system would concentrate earlier on those parts of the spatial subregions in which the ball or child was detected. The object recognition can thus be accelerated. As a result of the combination of two sensor systems, wherein one of them scans its surroundings at least partly stochastically and the other systematically detects the surroundings, the advantages of both sensor systems can be expediently combined.

Overall, sensor system affords the possibility of reliably preventing aliasing artefacts that can occur during scanning by LIDAR systems. The reliability in the context of object recognition can be increased as a result. In the ideal case, objects 9' or 9", as was shown in FIG. 3, are detected more rapidly. This can be achieved by means of an expedient configuration of the sensor system 5 operating on the basis of a random component. The random component can also be combined with a deterministic component. The exact configuration of these two components can be adapted here to the respective requirements of the individual case.

LIST OF REFERENCE SIGNS

1 Emitter
2 Scanning unit
3 Light emission device
4 Detector
5 Sensor system
6 Light beam(s)
7 Optical unit
8 Computing unit
9 Object
10 Field of view
11 Image point
12 Scan image
13 Control unit
14 Overall image
15 Light sensor
t1 Point in time 1
t2 Point in time 2
t3 Point in time 3
t4 Point in time 4
6' reflected light beams
9' Bridge pier
9" Traffic sign
α Solid angle

The invention claimed is:

1. A method for operating a sensor system comprising a control unit and a light emission device having an emitter and a scanning unit, wherein the scanning unit comprises a plurality of mirror units, and wherein the method comprises:
    predefining a spatial region to be detected in the surroundings of the light emission device;
    scanning the predefined spatial region by light beams emitted by the light emission device in different spatial directions;
    driving the emitter with the control unit based on a random component;
    driving the mirror units with the control unit based on a further random component;
    emitting light beams from the emitter in the direction of the scanning unit at random points in time; wherein the light beams from the emitter at random points in time illuminate a randomly selected mirror unit of the plurality of mirror units; and
    deflecting the light beams, using the scanning unit, in the different spatial directions along which the light beams leave the light emission device.

2. The method as claimed in claim 1, wherein the driving the emitter is additionally based on a deterministic component.

3. The method as claimed in claim 1, further comprising determining the random component based on a true random number and/or a pseudo-random number.

4. The method as claimed in claim 1, wherein the scanning unit, based on its own movement, changes its relative orientation with respect to the emitter at predefined points in time.

5. The method as claimed in claim 1, wherein the sensor system further comprises a detector configured to receive reflections of the emitted light beams; and further comprising receiving the reflections of the emitted light beams with the detector.

6. The method as claimed in claim 5, further comprising generating an overall image from a deconvolution based on the light beams received by the detector.

7. The method as claimed in claim 5, further comprising generating an overall image from a calculation of mean or median values based on the light beams received by the detector.

8. The method as claimed in claim 1, wherein the light beams emitted by the light emission device is pulsed light.

9. The method as claimed in claim 5, further comprising:
    defining at least one subregion based on the reflected light beams in the predefined spatial region; and
    examining the at least one subregion by a second sensor system.

10. A sensor system comprising:
    a light emission device comprising:
        an emitter configured to emit light beams in different spatial directions; and
        a scanning unit configured to scan surroundings of the light emission device at least partially randomly and configured to scan a predefined spatial region; wherein the scanning unit comprises a plurality of mirror units;
    a control unit configured to drive the scanning unit of the light emission device based on a random component, wherein the control unit is further configured to drive the mirror units based on a further random component, wherein:
    the emitter emits light beams in the direction of the scanning unit at random points in time;
    wherein the light beams from the emitter at random points in time illuminate a randomly selected mirror unit of the plurality of mirror units; and
    wherein the scanning unit is configured to deflect the light beams in different spatial directions along which the light beams leave the emitter.

11. The sensor system as claimed in claim 10, wherein the control unit comprises a random number generator configured to generate pseudo-random numbers and/or true random numbers for the determination of the random component.

12. The sensor system as claimed in claim 10, wherein the sensor system further comprises a detector configured to receive the light beams and a computing unit configured to generate an overall image based on the light beams received by the detector.

13. The sensor system as claimed in claim 10, wherein the light emission device is a laser scanner.

14. A vehicle comprising the sensor system as claimed in claim 10.

15. The vehicle as claimed in claim 14, wherein the vehicle has a further means of locomotion arranged on the vehicle in a stationary state; and wherein the further means of locomotion is not physically connected to the vehicle spatially in an activation state.

16. The method of claim 8, wherein the light beams are emitted at a wavelength ranging from 850 nm to 1600 nm.

17. The sensor system of claim 13, wherein the laser scanner is a LIDAR system.

\* \* \* \* \*